US012683528B2

(12) United States Patent
Vanevenhoven

(10) Patent No.: US 12,683,528 B2
(45) Date of Patent: Jul. 14, 2026

(54) GENERATOR CONTROL ARCHITECTURE

(71) Applicant: Hamilton Sundstrand Corporation,
Charlotte, NC (US)

(72) Inventor: Jordan K. Vanevenhoven, Rockford,
IL (US)

(73) Assignee: Hamilton Sundstrand Corporation,
Charlotte, NC (US)

( * ) Notice: Subject to any disclaimer, the term of this
patent is extended or adjusted under 35
U.S.C. 154(b) by 365 days.

(21) Appl. No.: 18/143,141

(22) Filed: May 4, 2023

(65) Prior Publication Data

US 2024/0372492 A1 Nov. 7, 2024

(51) Int. Cl.
H02P 9/00 (2006.01)
B60R 16/03 (2006.01)
H02P 9/10 (2006.01)
H02P 101/30 (2015.01)

(52) U.S. Cl.
CPC .............. H02P 9/006 (2013.01); B60R 16/03
(2013.01); H02P 9/10 (2013.01); B64D
2221/00 (2013.01); H02P 2101/30 (2015.01)

(58) Field of Classification Search
CPC ........ H02P 9/006; H02P 9/10; H02P 2101/30;
B60R 16/03; B64D 2221/00
See application file for complete search history.

(56) References Cited

U.S. PATENT DOCUMENTS 4,118,688 A * 10/1978 Glennon ................. G08B 29/14
340/506
5,325,043 A * 6/1994 Parro ........................ H02P 9/42
322/29

5,422,778 A 6/1995 Good et al.
8,294,429 B2 10/2012 Fuller et al.
8,576,522 B2 11/2013 Beneditz et al.
9,413,162 B2 8/2016 Brouwer et al.
10,003,186 B2 6/2018 Wagner et al.
10,432,120 B2 10/2019 Maddali et al.
2010/0039073 A1 * 2/2010 Santhirahasan ......... H02P 9/302
322/25

(Continued)

FOREIGN PATENT DOCUMENTS

WO 1986/004187 A1 7/1986

OTHER PUBLICATIONS

European Search Report dated Sep. 16, 2024 in connection with
European Patent Application No. 24174211.3, 8 pages.

*Primary Examiner* — Zoheb S Imtiaz

(57) ABSTRACT

An electric machine control system includes a control unit,
wherein the control unit includes inputs for a POR voltage
feedback, an electric machine current feedback, a PMG
feedback, and an input speed feedback. A protection unit
includes inputs for: the POR voltage feedback, the electric
machine current feedback, the PMG feedback, and the input
speed feedback. At least one trip connection connects
between the control unit and the protection unit. A method
of generator control includes receiving an input speed feed-
back, a generator line contactor (GLC) auxiliary feedback, a
generator control switch (GCS) feedback, and the weight on
wheels feedback in a control unit. The method includes
determining within the control unit if voltage regulation
and/or frequency regulation should be enabled independent
from a protection unit operatively connected to the control
unit.

20 Claims, 1 Drawing Sheet

(56)  References Cited

U.S. PATENT DOCUMENTS

| 2012/0106007 | A1* | 5/2012 | Beneditz | ............. | H02P 29/0241 |
| | | | | | 361/18 |
| 2012/0106009 | A1 | 5/2012 | Beneditz et al. | | |
| 2012/0182648 | A1* | 7/2012 | Maddali | .................. | H02P 9/302 |
| | | | | | 361/21 |
| 2012/0194948 | A1* | 8/2012 | Patel | ...................... | H02H 7/065 |
| | | | | | 361/21 |
| 2017/0365993 | A1* | 12/2017 | Wagner | ..................... | H02P 9/14 |

* cited by examiner

100
106   POR voltage
108   Gen current
110   PMG
112   Input speed
114   GCS
102
Control
122   PWM
120
Exciter Drive
Enable
140
126   GCR enable status
132   Contractor enable
134   138   136
trip   BIT   control trip
104
Protection + System Control
124   GCR enable
116   GLC aux
118   Weight on wheels
130   Contactor Command
128
Contactor Driver

GENERATOR CONTROL ARCHITECTURE

BACKGROUND

1. Field

The present disclosure relates to controllers, and more particularly to control architectures for control and protection functions for generators such as for use on aircraft.

2. Description of Related Art

In aircraft electric systems, the electric power generation system contains a generator which may be driven by an engine, auxiliary propulsion unit (APU), or RAM air-turbine. The generator is controlled by a Generator Control Unit (GCU), which controls excitation to set the generator output voltage to the desired output level. In the case of IDG (integrated drive generator) or VSCF (variable speed constant frequency) generator, the GCU may also control generator output frequency. To have independence between generator control and protection functions, the GCU may contain multiple digital signal processors (DSP's), field programmable gate arrays (FPGA's), or microprocessors with different functions allocated between them. This will result in a control DSP or FPGA which handles voltage regulation (and frequency regulation if applicable) and a protection microprocessor or FPGA which monitors the generator voltages and currents to determine if the channel should be online or should be offline to protect the generator and/or electric power system. This independence may be driven by system safety requirements.

Although this architecture may protect against failures or errors of the control DSP/FPGA, it may not provide adequate independence between control and protection for some safety requirements, where an error or failure of the protection function could cause erroneous control, defeating independence claims. Some applications with critical system safety requirements may implement an external power quality monitor to provide independent protective function separate from the GCU. This adds cost and weight, and it is desired to provide independence internal to the GCU.

The conventional techniques have been considered satisfactory for their intended purpose. However, there is an ever present need for improved systems and methods for generator control architectures. This disclosure provides a solution for this need.

SUMMARY

An electric machine control system includes a control unit. The control unit includes inputs for: a POR voltage feedback, an electric machine current feedback, a PMG feedback, and an input speed feedback. The system includes a protection unit. The protection unit includes inputs for: the POR voltage feedback, the electric machine current feedback, the PMG feedback, and the input speed feedback. At least one trip connection connects between the control unit and the protection unit.

The control unit can include at least one of a digital signal processor (DSP) or a field programmable gate array (FPGA). The protection unit can include at least one of a microprocessor or a field programmable gate array (FPGA).

An exciter drive can be configured to drive electric machine excitation. The exciter drive can be operatively connected to receive exciter drive control commands from the control unit, and to receive a generator control relay (GCR) enable signal from the protection unit for enabling and disabling the exciter drive. The control unit can include an input connected to receive the GCR enable signal from the protection unit.

A servo drive can be included, wherein the servo drive is operatively connected to receive servo drive control commands from the control unit, and to receive a servo control relay enable signal from the protection unit for enabling and disabling the servo drive. The control unit can include an input connected to receive the servo control relay enable signal from the protection unit.

An inverter drive can be included, wherein the inverter drive is operatively connected to receive inverter drive control commands from the control unit, and to receive an inverter control relay enable signal from the protection unit for enabling and disabling the inverter drive. The control unit can include an input connected to receive the inverter control relay enable signal from the protection unit.

A contactor driver can be configured to drive an electric machine contactor. The contactor driver can be operatively connected to receive a contactor command signal from the protection unit, and to receive a contactor enable signal from the control unit for enabling and disabling the contactor driver. The at least one trip connection can include a first trip connection for providing trip output from the protection unit as input to the control unit for communicating a protection trip to the control unit, and a second trip connection for providing trip output from the control unit as input to the protection unit for communicating a need for a trip from the control unit to the protection unit. The control unit can include inputs for: a generator control switch (GCS) feedback, a generator line contactor (GLC) auxiliary feedback, and a weight on wheels feedback. The protection unit can include inputs for: the GCS feedback, the GLC auxiliary feedback, and the weight on wheels feedback.

The control unit can include internal enable logic for enabling and disabling an internal enable of the control unit based on the POR voltage feedback, the electric machine current feedback, the PMG feedback, the input speed feedback, the GCS feedback, the GLC auxiliary feedback, and the weight on wheels feedback, wherein there is no enable connection from the protection unit to the control unit. A built in test (BIT) command connection can be included from the protection unit to the control unit for initiating a BIT procedure.

A method of generator control includes receiving an input speed feedback, a generator line contactor (GLC) auxiliary feedback, a generator control switch (GCS) feedback, and the weight on wheels feedback in a control unit. The method includes determining within the control unit if voltage regulation and/or frequency regulation should be enabled independent from a protection unit operatively connected to the control unit.

The method can include receiving separate voltage reduction and frequency reduction trip commands from the protection unit to the control unit, and disabling voltage and/or frequency command output from the control unit to an exciter drive or servo drive based on the trip commands. The control unit can include a GLC enable logic that either outputs an enable signal as input to a contactor driver or controls a contactor coil return. The method can include the protection unit initiating built in test (BIT) tests, and the control unit can include logic to prevent BIT tests from inducing erroneous control from the protection unit. The control unit can monitor the protection unit for outputs from the protection unit.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain FIGURES, wherein:

FIG. 1 is a schematic view of an embodiment of an electric machine control system constructed in accordance with the present disclosure, showing the inputs, outputs, and interconnections of the control unit and the protection unit.

DETAILED DESCRIPTION OF THE PREFERRED EMBODIMENTS

Reference will now be made to the drawings wherein like reference numerals identify similar structural features or aspects of the subject disclosure. For purposes of explanation and illustration, and not limitation, a partial view of an embodiment of an electric machine control system in accordance with the disclosure is shown in FIG. 1 and is designated generally by reference character 100. The systems and methods described herein can be used to federate control and protection functions in generator control units (GCUs), motor controllers, and the like.

The electric machine control system 100 is described herein generally in the context of controlling a generator aboard an aircraft (e.g. system 100 can be used as a GCU for an aircraft generator), however those skilled in the art will readily appreciate that systems and methods as disclosed herein can readily be applied to other electrical machines such as motors or motor/generator units. The electric machine control system 100 includes a control unit 102 interconnected with a protection unit 104. Each of the control unit 102 and the protection unit 104 include respective inputs connected to receive the following: a POR (point of regulation) voltage feedback 106, an electric machine current feedback 108 (e.g. current from a generator or current supplied to a motor), a PMG feedback 110 (which is a voltage—PMG frequency can be related directly to generator output frequency and this can be used as sense input for frequency regulation), an input speed feedback 112 (e.g. generator speed or prime mover speed such as engine/engine gearbox speed), a generator control switch (GCS) feedback 114 (e.g. from a switch in a cockpit to activate or deactivate the generator), a generator line contactor (GLC) auxiliary (e.g. status) feedback 116, and a weight on wheels feedback 118 (e.g. for input as to whether an aircraft is on the ground or not).

The control unit 102 can be a digital signal processor (DSP), a field programmable gate array (FPGA), or any suitable equivalent. The protection unit 104 can be at least one of a microprocessor, a field programmable gate array (FPGA), or any suitable equivalent.

An exciter drive 120 is configured to drive electric machine excitation, e.g. for a generator or motor. The exciter drive 120 is operatively connected to receive pulse width modulated (PWM) exciter drive control commands 122 for voltage control of the electric machine that are output from the control unit 102, and to receive a generator control relay (GCR) enable signal 124 from the protection unit for enabling and disabling the exciter drive 120 for protection purposes. The control unit 102 includes an input connected to receive the GCR enable signal status 126 from the protection unit 104.

If it were desired to perform frequency control, e.g. instead of voltage control, that would be from a servo drive or equivalent. For servo or governor drive and frequency control, the drive (not pictured, but in place of or in addition to the exciter driver 120) would similarly have a servo enable relay and relay command would be monitored by control as depicted for the exciter drive 120. Similarly, an inverter system which has inverter drive circuitry with similar PWM commands/enables, to those shown for the exciter drive 120 in FIG. 1 can be used in addition to or in lieu of the exciter drive 120 in FIG. 1. Something like a variable speed constant frequency (VSCF) generator can have the generator control as discussed above plus the inverter control, e.g. with no servo or governor control needed.

A contactor driver 128 is configured to drive an electric machine contactor, e.g. to bring a generator on and off from an electrical bus in an aircraft. The contactor driver 128 is operatively connected to receive a contactor command signal 130 from the protection unit 104 for controlling the contactor, and to receive a contactor enable signal 132 from the control unit 102 for enabling and disabling the contactor driver 128.

The control unit 102 can disable the contactor driver 128, forcing the contactor open or preventing it from being closed. When the control unit 102 enables the contactor driver 128, the contactor will follow the state of the contactor command signal 130 from the protection unit 104. Control 102 is not able to close the contactor, and can only provide an enable to allow protection 104 do so. The protection unit 104 can provide primary protective function for the contactor (e.g., failed to open, failed to close, or chatter) via the GLC aux 116. Control 102 may set the enable based on whether or not voltage regulation (VR) is enabled, protection 104 set a trip condition, or control 102 has set a trip condition. Therefore, if VR is off, the contactor should not be closed, and control 102 can prevent it from being closed.

Trip connections 134, 136 interconnect between the control unit 102 and the protection unit 104. A first trip connection 134 provides trip output from the protection unit 104 as input to the control unit 102 for communicating when there has been a protection trip to the control unit 104. A second trip connection 136 provides trip output from the control unit 102 as input to the protection unit 104 for communicating a need for a trip from the control unit 102 to the protection unit 104 when the logic in the control unit 102 determines there is a need for a trip, e.g. to disconnect and or shut down a generator connected to the exciter driver 120 and contactor driver 128. A built in test (BIT) command connection 138 connects from the protection unit 104 to the control unit 102 for initiating a BIT procedure, e.g. for ensuring proper system function.

The control unit 102 includes internal enable logic for enabling and disabling an internal enable 140 of the control unit 102 based on the POR voltage feedback 106, the electric machine current feedback 108, the PMG feedback 110, the input speed feedback 112, the GCS feedback 114, the GLC auxiliary feedback 116, and the weight on wheels feedback 118. Since the control unit 102 can enable/disable itself, there need be no enable connection from the protection unit 104 to the control unit 102.

The control unit 102 and the protection unit 104 include logic for performing methods as disclosed herein. A method of generator control (which can be adapted to motor control) includes receiving an input speed feedback 112, a generator line contactor (GLC) auxiliary feedback 116, a generator control switch (GSC) feedback 114, and the weight on wheels feedback 118 in a control unit 102. The method includes determining within the control unit 102 if voltage regulation and/or frequency regulation should be enabled independent from a protection unit 104 operatively connected to the control unit 102.

In place of the VR/FR (voltage regulation/frequency regulation) enable input it used to receive from the protection unit 104 in traditional configurations, the control unit 102 receives instead a trip indication 134. The method includes receiving separate voltage reduction and frequency reduction trip commands from the protection unit 104 to the control unit 102, and disabling voltage and/or frequency command output from the control unit 102 to an exciter drive 120 based on the trip commands 134. VR and FR may have separate trip indications. Once this indication(s) is active, it disables VR and/or FR until there has been a cycle of the GCS switch or control system 100 power cycle, and provides a reciprocal trip indication 136 back to the protection unit 104 (either directly or via a watchdog if it is included), so that the protection unit 104 knows the control unit 102 has locked it out. The control unit 102 includes a GLC enable logic that either outputs an enable signal 132 as input to a contactor driver 128 or controls a contactor coil return.

The method includes the protection unit 104 initiating built in test (BIT) tests, to prevent BIT tests from inducing erroneous control from the protection unit. The control unit 102 can use inputs such as engine speed, weight on wheels, or generator line contactor status to determine if the BIT test should be carried out or ignored (i.e. a reduced voltage regulation test may be allowed if the aircraft is on the ground and the line contactor is open, but not initiated otherwise).

The method can include the control unit 102 monitoring the protection unit 104 for outputs from the protection unit 104, such as GCR enable 124 or GLC command 130. If the control unit 102 sees the GCR is commanded open when the protective trip indication is not active, or limiting (toggling) outside of an overvoltage condition, the control unit 102 can determine an error of the protection function has occurred and can disable VR and perform subsequent action as needed if it had received a trip indication. A similar concept can be extended to monitoring the GLC command 130 (e.g. where the GLC is commanded closed with no power quality or after the system 100 has tripped, is commanded open or toggling when power quality exists, and the like). For this case the control unit 102 could remove its own GLC command enable 132.

Systems and methods as disclosed herein provide a GCU architecture that gives primary voltage/frequency enable responsibility to the control unit 102. It also provides other system inputs and protection unit inputs to the control unit 102 so the control unit 102 can prevent erroneous or failed protection unit 104 behavior from inducing abnormal power quality (e.g., under voltage, under frequency) via erroneous BIT, voltage limiting, and the like, which would otherwise defeat independence. Here the control unit 102 can initiate a trip itself if it sees abnormal behavior from the protection unit 104.

Systems and methods as disclosed herein provide potential benefits including the following. They provide independence internal to GCUs precluding a need for external power quality monitoring. They can provide cost savings via reduced weight, less inventory, and the like. This architecture can be applied to architectures where control and protection are federated to separate boards/LRM's/LRU's (line replaceable modules/line replaceable units). This architecture can also be applied to inverter systems.

The methods and systems of the present disclosure, as described above and shown in the drawings, provide for federating control and protection functions in generator control units (GCUs), motor controllers, and the like. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. An electric machine control system comprising:
a control unit, wherein the control unit includes inputs for:
    a point of regulation (POR) voltage feedback,
    an electric machine current feedback,
    a permanent magnet generator (PMG) feedback, and
    an input speed feedback; and
a protection unit, wherein the protection unit includes inputs for:
    the POR voltage feedback,
    the electric machine current feedback,
    the PMG feedback, and
    the input speed feedback;
wherein at least one trip connection connects between the control unit and the protection unit; and
wherein the control unit is configured to prevent the protection unit, when failed or acting erroneously, from inducing abnormal power quality in an electric machine.

2. The system as recited in claim 1, wherein at least one of:
    the control unit includes at least one of a digital signal processor (DSP) or a field programmable gate array (FPGA); or
    the protection unit includes at least one of a microprocessor or a field programmable gate array (FPGA).

3. The system as recited in claim 1, wherein the at least one trip connection is configured to provide separate voltage reduction and frequency reduction trip commands.

4. The system as recited in claim 1, further comprising an exciter drive configured to drive electric machine excitation, wherein the exciter drive is operatively connected to receive exciter drive control commands from the control unit and to receive a generator control relay (GCR) enable signal from the protection unit for enabling and disabling the exciter drive.

5. The system as recited in claim 4, wherein the control unit includes an input connected to receive the GCR enable signal from the protection unit.

6. The system as recited in claim 1, further comprising a servo drive, wherein the servo drive is operatively connected to receive servo drive control commands from the control unit and to receive a servo control relay enable signal from the protection unit for enabling and disabling the servo drive.

7. The system as recited in claim 6, wherein the control unit includes an input connected to receive the servo control relay enable signal from the protection unit.

8. The system as recited in claim 1, further comprising an inverter drive, wherein the inverter drive is operatively connected to receive inverter drive control commands from the control unit and to receive an inverter control relay enable signal from the protection unit for enabling and disabling the inverter drive.

9. The system as recited in claim 8, wherein the control unit includes an input connected to receive the inverter control relay enable signal from the protection unit.

10. The system as recited in claim 1, further comprising a contactor driver configured to drive an electric machine contactor, wherein the contactor driver is operatively connected to receive a contactor command signal from the protection unit and to receive a contactor enable signal from the control unit for enabling and disabling the contactor driver.

11. The system as recited in claim 1, wherein the at least one trip connection includes:

a first trip connection for providing trip output from the protection unit as input to the control unit for communicating a protection trip to the control unit; and a second trip connection for providing trip output from the control unit as input to the protection unit for communicating a need for a trip from the control unit to the protection unit.

12. The system as recited in claim 1, wherein the control unit further includes inputs for:

a generator control switch (GCS) feedback, a generator line contactor (GLC) auxiliary feedback, and a weight on wheels feedback, wherein the protection unit further includes inputs for:

the GCS feedback, the GLC auxiliary feedback, and the weight on wheels feedback.

13. The system as recited in claim 12, wherein the control unit includes internal enable logic for enabling and disabling an internal enable of the control unit based on the POR voltage feedback, the electric machine current feedback, the PMG feedback, the input speed feedback, the GCS feedback, the GLC auxiliary feedback, and the weight on wheels feedback, wherein there is no enable connection from the protection unit to the control unit.

14. The system as recited in claim 1, further comprising a built in test (BIT) command connection from the protection unit to the control unit for initiating a BIT procedure.

15. A method of generator control comprising:

receiving an input speed feedback, a generator line contactor (GLC) auxiliary feedback, a generator control switch (GCS) feedback, and a weight on wheels feedback in a control unit; and determining within the control unit whether to enable voltage regulation and/or frequency regulation independent from a protection unit operatively connected to the control unit;

wherein the control unit prevents the protection unit, when failed or acting erroneously, from inducing abnormal power quality in an electric machine.

16. The method as recited in claim 15, further comprising receiving separate voltage reduction and frequency reduction trip commands from the protection unit to the control unit, and disabling voltage and/or frequency command output from the control unit to an exciter drive or servo drive based on the trip commands.

17. The method as recited in claim 15, wherein the control unit includes a GLC enable logic that either outputs an enable signal as input to a contactor driver or controls a contactor coil return.

18. The method as recited in claim 15, further comprising initiating, by the protection unit, built in test (BIT) tests, wherein the control unit includes logic to prevent the BIT tests from inducing erroneous control from the protection unit.

19. The method as recited in claim 15, further comprising monitoring, by the control unit, the protection unit for outputs from the protection unit.

20. The method as recited in claim 15, further comprising, upon determining an error of a protective function, using the control unit to disable voltage regulation.

* * * * *